US012405548B2

(12) United States Patent
Watanabe

(10) Patent No.: US 12,405,548 B2
(45) Date of Patent: Sep. 2, 2025

(54) OPTICAL DEVICE

(71) Applicant: TOSHIBA TEC KABUSHIKI KAISHA, Tokyo (JP)

(72) Inventor: Takeshi Watanabe, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 440 days.

(21) Appl. No.: 18/104,805

(22) Filed: Feb. 2, 2023

(65) Prior Publication Data

US 2024/0264549 A1 Aug. 8, 2024

(51) Int. Cl.
*G03B 27/52* (2006.01)
*G02B 17/00* (2006.01)
*G03G 15/04* (2006.01)

(52) U.S. Cl.
CPC ..... *G03G 15/04045* (2013.01); *G02B 17/002* (2013.01); *G03B 27/528* (2013.01)

(58) Field of Classification Search
CPC ......... G03G 15/04045; G03G 15/0435; G02B 17/002; G03B 27/528
See application file for complete search history.

(56) References Cited

U.S. PATENT DOCUMENTS

| 2010/0020421 A1 | 1/2010 | Shimmo et al. |
| 2010/0073772 A1* | 3/2010 | Ito .............................. B41J 2/451 359/622 |
| 2016/0216634 A1* | 7/2016 | Shiraishi ............ G03G 15/0409 |
| 2021/0271185 A1 | 9/2021 | Shiraishi |

FOREIGN PATENT DOCUMENTS

| JP | 4-8569 | 1/1992 |
| JP | 2014-89370 | 5/2014 |

* cited by examiner

*Primary Examiner* — James A Dudek
(74) *Attorney, Agent, or Firm* — Amin, Turocy & Watson, LLP

(57) ABSTRACT

An optical device according to an embodiment includes a lens mirror array and a holder. The lens mirror array is opposed to a light emitting section. The lens mirror array includes a plurality of optical elements. The optical elements include incident-side lens surfaces, emission-side lens surfaces that emit incident light, and reflection surfaces that reflect incident light. A cross section orthogonal to a first direction of the lens mirror array has a constricted shape. The holder includes a slit having width smaller than width of both the ends in the cross section of the lens mirror array and larger than width of the center in the cross section and extending in the first direction. The holder holds the lens mirror array in a state in which a constricted portion in the center in the cross section of the lens mirror array is disposed in the slit.

20 Claims, 4 Drawing Sheets

OPTICAL DEVICE

FIELD

Embodiments described herein relate generally to an optical device including a lens mirror array, and an image forming apparatus containing the optical device.

BACKGROUND

A printer or a multifunction peripheral includes, for example, as an exposure device for forming an electrostatic latent image on a photoconductive drum, a solid-state head including a light emitting element such as an LED. The solid-state head includes, for example, a substrate on which a plurality of light emitting elements are arrayed and mounted, a SELFOC lens array (SLA) disposed to be opposed to the plurality of light emitting elements, and a holder that positions and holds the substrate and the SLA. The SLA has structure in which a plurality of micro rod lenses are arrayed and embedded in resin. The solid-state head has approximately the same length as the length of the photoconductive drum.

Since the SLA is made of long resin, the SLA is easily bent by an external force. If the SLA is bent, defocus occurs. Therefore, the rigidity of the holder that holds the SLA needs to be set as high as possible. Since the SLA has a short focal length and a small depth of field, the solid-state head needs to be disposed close to the photoconductive drum. Therefore, the solid-state head is desirably made as thin as possible. However, if the size of the holder is increased or a reinforcement member is attached to the holder to increase the rigidity of the holder, the width of the holder also increases to make it difficult to dispose the solid-state head close to the photoconductive drum.

DETAILED DESCRIPTION

An optical device according to an embodiment includes a lens mirror array and a holder. The lens mirror array is opposed to a light emitting section extending in a first direction. The lens mirror array includes a plurality of optical elements side by side in the first direction. The optical elements include incident-side lens surfaces on which light emitted from the light emitting section is made incident, emission-side lens surfaces that emit the incident light, and reflection surfaces that reflect the light made incident from the incident-side lens surfaces toward the emission-side lens surfaces. A cross section orthogonal to the first direction of the lens mirror array has a constricted shape, a center of which is narrower than both ends thereof that are along an optical path on which the light emitted from the light emitting section passes. The holder includes a slit having width smaller than width of both the ends in the cross section of the lens mirror array and larger than width of the center in the cross section and extending in the first direction. The holder holds the lens mirror array in a state in which constricted portion in the center in the cross section of the lens mirror array is disposed in the slit.

The embodiment is explained below with reference to the drawings.

Figure 1:
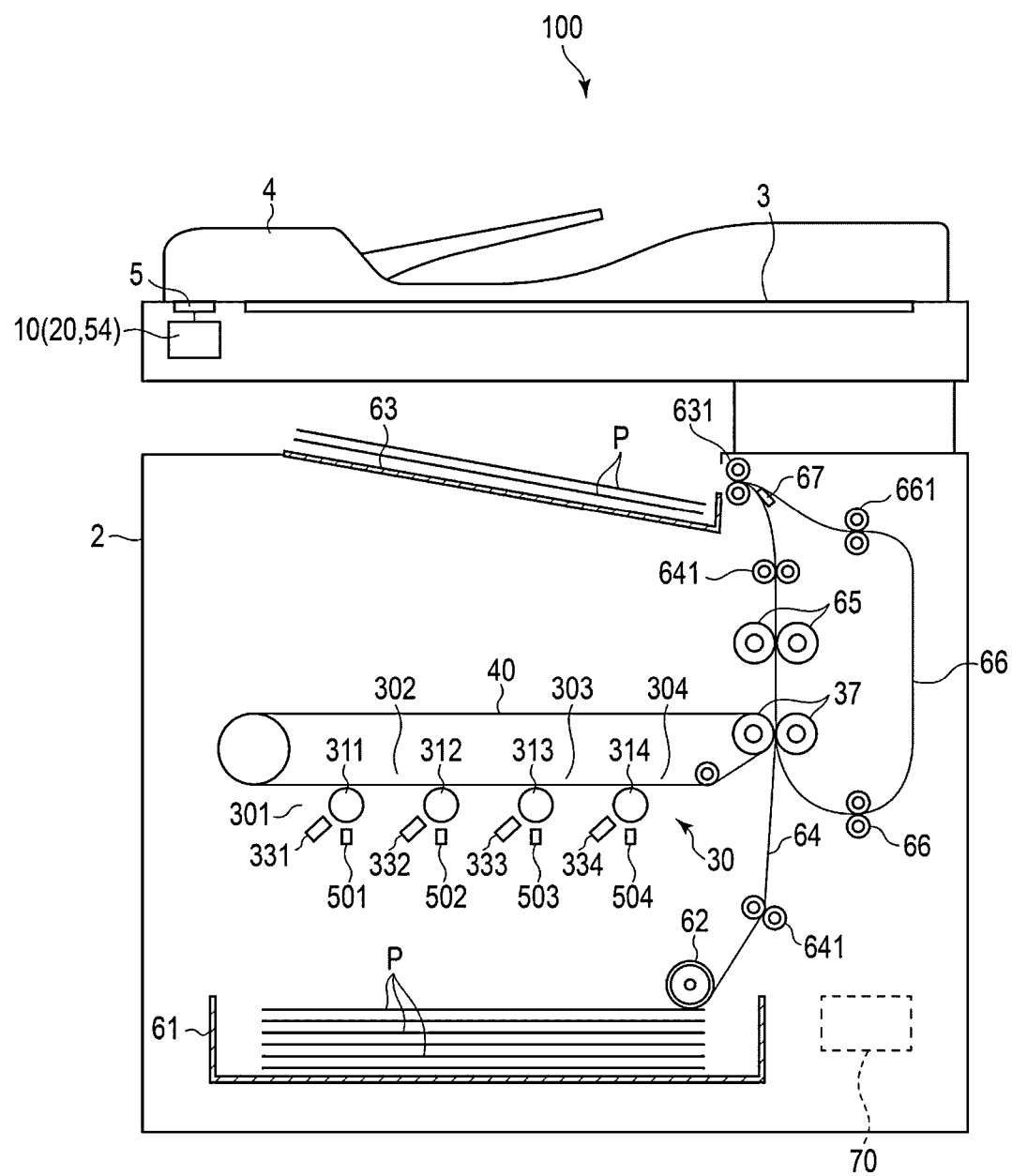
FIG. 1 is a schematic diagram illustrating an example of an image forming apparatus including a solid-state head.

An image forming apparatus 100 illustrated in FIG. 1 is a so-called multifunction peripheral including, for example, a print function, a copy function, and a scan function. The image forming apparatus 100 includes a housing 2. A transparent original table glass 3, on which an original is set, is present on the upper surface of the housing 2. The original table glass 3 and a reading glass 5 disposed in parallel to the original table glass 3 are present on the upper surface of the housing 2. The original table glass 3 and the reading glass 5 are disposed side by side in the left-right direction in FIG. 1 (a sub-scanning direction). An auto document feeder (ADF) 4 is present on the original table glass 3. The ADF 4 is capable of opening and closing the original table glass 3. The ADF 4 functions as an original cover for pressing the original placed on the original table glass 3 and has a function of feeding the original through the reading glass 5.

An original reading device 10 is present in the housing 2 under the original table glass 3. The original reading device 10 is an example of the optical device described in the claims of the present application. The original reading device 10 is movable in the sub-scanning direction along the original table glass 3 by a not-illustrated driving mechanism and can be fixed under the reading glass 5 (in a position illustrated in FIG. 1). The original reading device 10 extends in a main scanning direction (the first direction) orthogonal to the paper surface of FIG. 1 and causes a not-illustrated image sensor to form an erected image of an original.

The original reading device 10 includes a lens mirror array 20 and a holder 54 having substantially the same structure as the structure of a solid-state head 504 explained below. Accordingly, the lens mirror array 20 and the holder 54 are explained in detail below in explanation of the solid-state head 504. Explanation of the lens mirror array 20 and the holder 54 of the original reading device 10 is omitted.

If an original is read, for example, the original reading device 10 is fixed under the reading glass 5 (a state illustrated in FIG. 1), the original is fed by the ADF 4, and the original is irradiated with illumination light via the reading glass 5. The lens mirror array 20 guides reflected light reflected from the original and forms an image on the image sensor. A surface extending in the main scanning direction on which the original receives the illumination light is a surface that reflects the light and is an example of the light emitting section described in the claims of the present application. The original reading device 10 photoelectrically converts the reflected light reflected from the original and received by the image sensor and outputs the reflected light as an image signal.

At this time, the original reading device 10 reads, line by line in the main scanning direction, an erected image of the original passing on the reading glass 5 according to the operation of the ADF 4. If the original passes on the reading glass 5 in the sub-scanning direction, the original reading device 10 can acquire an image of the entire original (for a plurality of lines). Alternatively, if the original is set on the original table glass 3 and the original reading device 10 is moved in the sub-scanning direction along the original table glass 3, similarly, the original reading device 10 can read, line by line in the main scanning direction, an erected image of the original formed on the image sensor via the lens mirror array 20 and acquire an image of the entire original.

The image forming apparatus 100 includes an image forming section 30 substantially in the center in the housing 2. The image forming section 30 includes a yellow unit 301, a magenta unit 302, a cyan unit 303, and a black unit 304 in a traveling direction of an intermediate transfer belt 40. Since the color units 301, 302, 303, and 304 of the image forming section 30 have substantially the same structure, the black unit 304 is representatively explained herein. Detailed explanation about the other color units 301, 302, and 303 is omitted.

Figure 2:
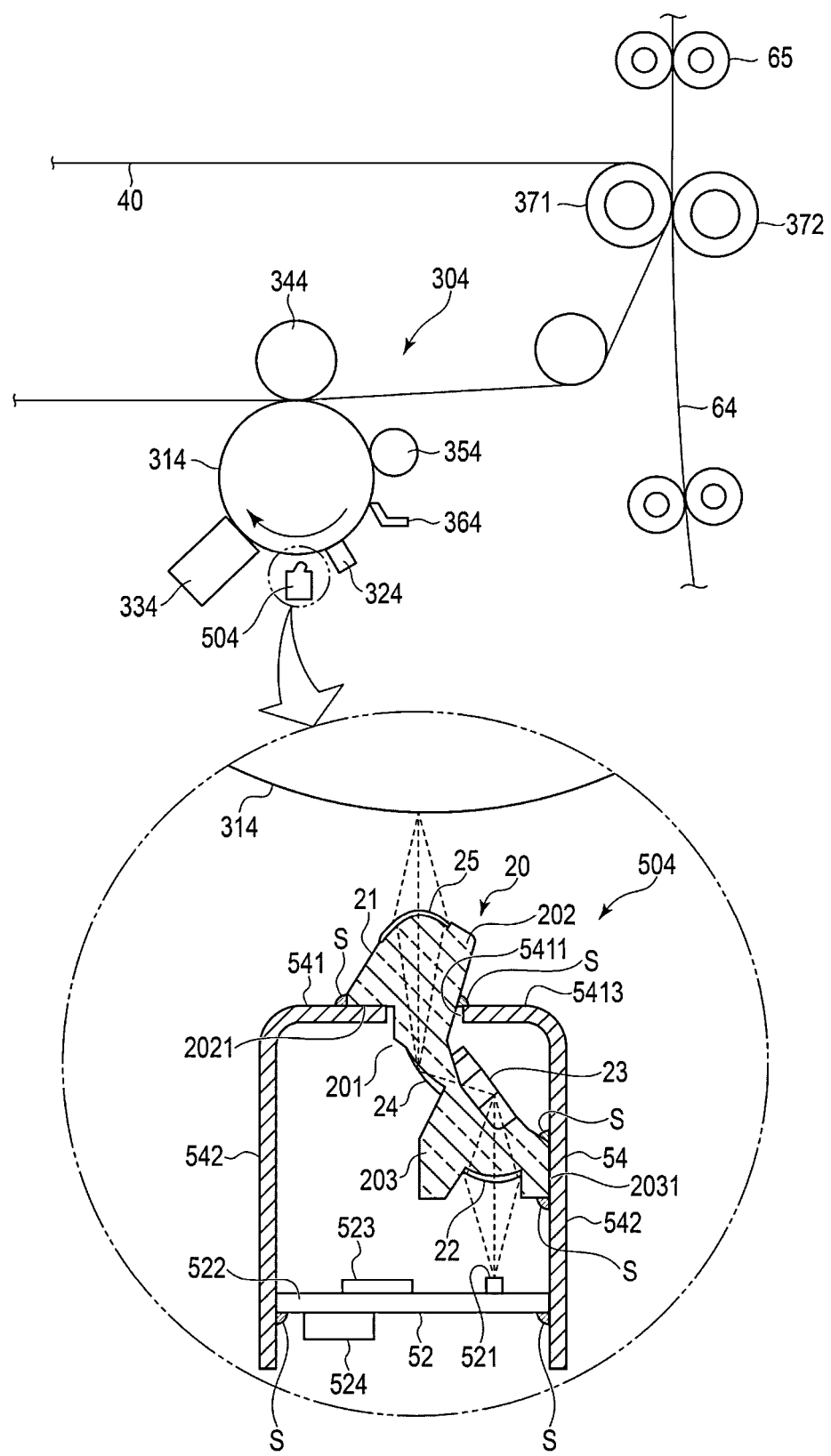
FIG. 2 is a schematic diagram illustrating an example of the solid-state head.

As illustrated in FIG. 2, the black unit 304 includes, for example, a photoconductive drum 314, an electrifying charger 324, a solid-state head 504, a developing device 334, a primary transfer roller 344, a cleaner 354, and a blade 364. Solid-state heads 501, 502, 503, and 504 of the color units 301, 302, 303, and 304 are examples of the optical device described in the claims of the present application. The intermediate transfer belt 40 is wound around a plurality of rollers and extended endlessly and travels in the counterclockwise direction in FIG. 2.

The photoconductive drum 314 has a rotation axis extending in the main scanning direction. The photoconductive drum 314 rotates in a state in which the outer circumferential surface thereof is set in contact with the surface of the intermediate transfer belt 40. The primary transfer roller 344 is present on the inner side of the intermediate transfer belt 40 opposed to the photoconductive drum 314. The photoconductive drum 314 is rotated by a not-illustrated driving mechanism in an illustrated arrow direction (the clockwise direction) at the same peripheral speed as the peripheral speed of the intermediate transfer belt 40.

The electrifying charger 324 uniformly charges the surface of the photoconductive drum 314. The solid-state head 504 irradiates the surface of the photoconductive drum 314 with exposure light based on an image signal for color-separated black and forms an electrostatic latent image based on the image signal for black on the surface of the photoconductive drum 314. The developing device 334 supplies black toner to the electrostatic latent image formed on the surface of the photoconductive drum 314 and forms a black toner image on the surface of the photoconductive drum 314.

The primary transfer roller 344 transfers the black toner image formed on the surface of the photoconductive drum 314 to be superimposed on toner images of the other colors. The cleaner 354 and the blade 364 remove toner remaining on the surface of the photoconductive drum 314. The color toner images transferred to be superimposed one another on the surface of the intermediate transfer belt 40 move according to the traveling of the intermediate transfer belt 40.

A transfer roller pair 37 for transferring, onto paper P, the color toner images transferred to be superimposed one another on the surface of the intermediate transfer belt 40 is present on a downstream side of the black unit 304 in the traveling direction of the intermediate transfer belt 40. One transfer roller 371 is present on the inner side of the intermediate transfer belt 40. The intermediate transfer belt 40 is supported by the one transfer roller 371. The other transfer roller 372 is opposed to the one transfer roller 371 across the intermediate transfer belt 40.

Referring back to FIG. 1, a paper feeding cassette 61 in which a plurality of pieces of paper P of a predetermined size are stacked and stored is present near the lower end in the housing 2 of the image forming apparatus 100. The paper feeding cassette 61 can be, for example, drawn out and received from the front surface of the housing 2. A pickup roller 62 that picks up a piece of paper P at the upper end in a stacking direction among the pieces of paper P stored in the paper feeding cassette 61 is present at an illustrated right upper end of the paper feeding cassette 61. The pickup roller 62 rotates with the circumferential surface thereof set in contact with the paper P to pick up the pieces of paper P one by one.

A paper discharge tray 63 is present in an upper part in the housing 2. The paper discharge tray 63 is present between the original table glass 3 and the image forming section 30 and discharges the paper P, on which an image is formed, into the body of the image forming apparatus 100. A conveying path 64 for conveying the paper P picked up from the paper feeding cassette 61 in the longitudinal direction toward the paper discharge tray 63 is present between the pickup roller 62 and the paper discharge tray 63. The conveying path 64 extends through a nip of the transfer roller pair 37 and includes a plurality of conveying roller pairs 641 and a not-illustrated conveyance guide. A paper discharge roller pair 631 for discharging the paper P to the paper discharge tray 63 is present at the terminal end of the conveying path 64. The paper discharge roller pair 631 is rotatable in both of forward and backward directions.

A fixing roller pair 65 is present on the conveying path 64 on the downstream side of the transfer roller pair 37 (the illustrated upper side). The fixing roller pair 65 heats and pressurizes the paper P conveyed via the conveying path 64 and fixes, on the surface of the paper P, a toner image transferred onto the surface of the paper P.

The image forming apparatus 100 includes a reverse conveying path 66 for reversing the paper P, on one surface of which an image is formed, and feeding the paper P into the nip of the transfer roller pair 37. The reverse conveying path 66 includes a plurality of conveying roller pairs 661 that nip the paper P and rotates to convey the paper P and a not-illustrated conveyance guide. A gate 67 that switches a conveyance destination of the paper P between the conveying path 64 and the reverse conveying path 66 is present on an upstream side of the paper discharge roller pair 631.

If an image is formed on the paper P, the image forming apparatus 100 rotates the pickup roller 62 to pick up the paper P from the paper feeding cassette 61 and conveys, with the plurality of conveying roller pairs 641, the paper P toward the paper discharge tray 63 via the conveying path 64. At this time, the image forming apparatus 100 feeds the color toner images transferred and formed on the surface of the intermediate transfer belt 40 into the nip of the transfer roller pair 37 to be timed to coincide with conveyance timing of the paper p, gives a transfer voltage to the color toner images with the transfer roller pair 37, and transfers the color toner images onto the surface of the paper P.

The image forming apparatus 100 conveys the paper P, onto which the toner images are transferred through the fixing roller pair 65, to heat and pressurize the paper P, melts the toner images and presses the toner images against the surface of the paper P, and fixes the toner images on the paper P. The image forming apparatus 100 discharges the paper P, on which an image is formed in this way, to the paper discharge tray 63 via the paper discharge roller pair 631.

At this time, if a duplex mode for forming an image on the rear surface of the paper P as well is selected, the image forming apparatus 100 switches the gate 67 to the reverse conveying path 66 at timing immediately before the trailing end in a discharging direction of the paper P being discharged toward the paper discharge tray 63 passes through the nip of the paper discharge roller pair 631, reverses the paper discharge roller pair 631, and switches back and conveys the paper P. Consequently, the image forming apparatus 100 directs the trailing end of the paper P to the reverse conveying path 66 and reverses the paper P to feed the paper P into the nip of the transfer roller pair 37.

The image forming apparatus 100 forms, on the surface of the intermediate transfer belt 40, toner images based on image data formed on the rear surface of the paper P, causes the intermediate transfer belt 40 holding color toner images to travel, and feeds the color toner images into the nip of the transfer roller pair 37. Further, the image forming apparatus 100 transfers and fixes the toner images on the rear surface of the reversed paper P, and discharges the paper P to the paper discharge tray 63 via the paper discharge roller pair 631.

The image forming apparatus 100 includes a control section 70 that controls operations of the mechanisms explained above. The control section 70 includes a processor such as a CPU and a memory. The processor executes a program stored in the memory, whereby the control section 70 realizes various processing functions. The control section 70 controls the original reading device 10 to thereby acquire an image from an original. The control section 70 controls the image forming section 30 to thereby form an image on the surface of the paper P. For example, the control section 70 inputs image data read by the original reading device 10 to the image forming section 30. The control section 70 controls operations of the pluralities of conveying roller pairs 641 and 661 to convey the paper P through the conveying path 64 and the reverse conveying path 66.

The solid-state head 504 of the black unit 304 is explained below with reference to FIGS. 2 to 5. Detailed explanation of the solid-state heads 501, 502, and 503 of the other color units 301, 302, and 303 is omitted because the solid-state heads 501, 502, and 503 have the same structure as the structure of the solid-state head 504.

As illustrated in FIG. 2, the solid-state head 504 is separated from and opposed to the photoconductive drum 314 below the photoconductive drum 314 in FIG. 2. The solid-state head 504 includes the lens mirror array 20, a light source unit 52, and the holder 54. The components 20, 52, and 54 of the solid-state head 504 extend in the main scanning direction orthogonal to the paper surface parallel to the rotation axis of the photoconductive drum 314 and have substantially the same length as the length of the photoconductive drum 314.

The holder 54 holds the lens mirror array 20. The holder 54 and the lens mirror array 20 of the solid-state head 504 have the same structures as the structures of the holder 54 and the lens mirror array 20 of the original reading device 10 explained above. The lens mirror array 20 of the solid-state head 504 is attached in a direction vertically reversed from the direction of the lens mirror array 20 of the original reading device 10. The holder 54 of the solid-state head 504 fixes the light source unit 52. The holder 54 fixes the light source unit 52 and the lens mirror array 20 in a state in which the light source unit 52 and the lens mirror array 20 are alighted with each other.

Figure 3:
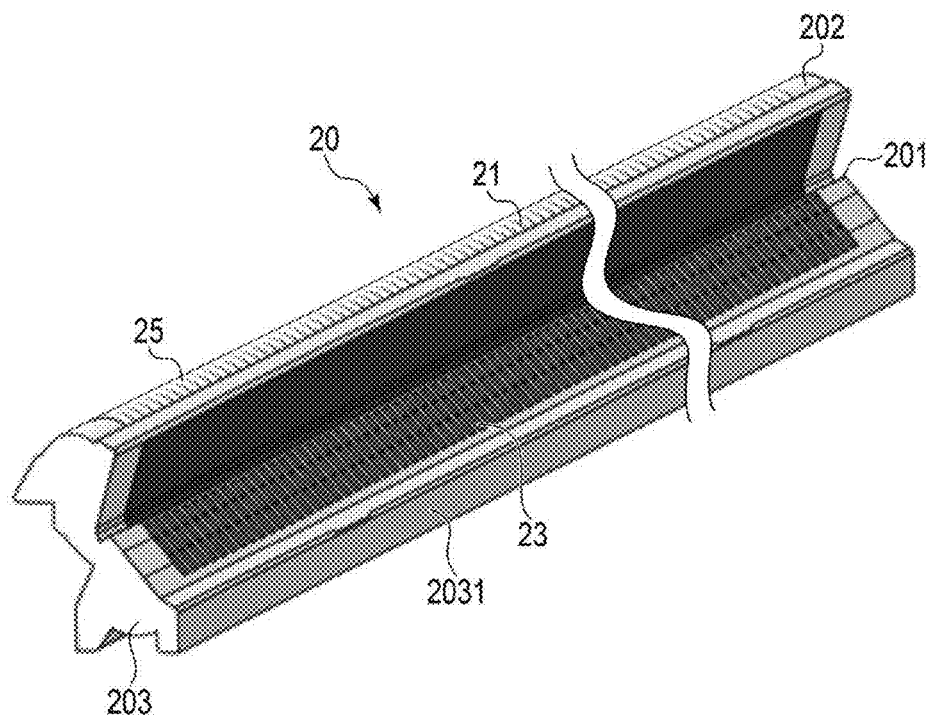
FIG. 3 is a perspective view illustrating a lens mirror array.
Figure 4:
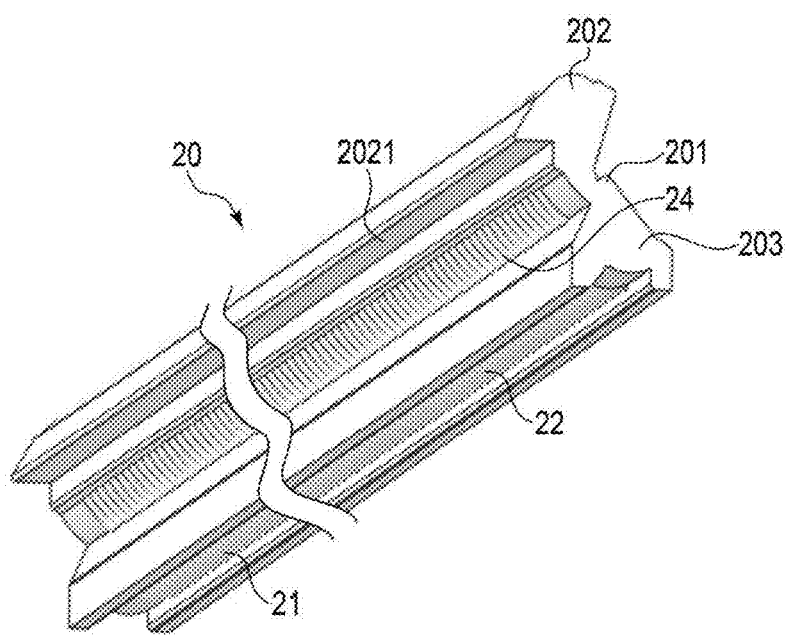
FIG. 4 is a perspective view of the lens mirror array viewed from another angle.

As illustrated in FIGS. 2 to 4, the lens mirror array 20 has structure in which a plurality of transparent optical elements 21 having the same shape are disposed side by side in the main scanning direction and integrated. FIG. 2 enlarges and illustrates a cross section of the lens mirror array 20 taken along a surface orthogonal to the main scanning direction between two optical elements 21 adjacent to each other. In this embodiment, the lens mirror array 20 is formed by integrally molding transparent resin. The lens mirror array 20 may be formed by transparent glass.

The optical elements 21 of the lens mirror array 20 guide diffused light diffused from an object point O to form an image at an image forming point F. One optical element 21 causes lights from a plurality of object points O arranged in the main scanning direction to form images on an image surface. For example, the one optical element 21 causes light from the object points O arranged in width twice or three times as large as a pitch in the main scanning direction of the optical element 21 to form images on the image surface. The optical element 21 reflects, on two reflection surfaces 23 and 24, light made incident on an incident-side lens surface 22 and emits the light via an emission-side lens surface 25 to form an erected image of the object point O at the image forming point F.

In the solid-state head 504, the object point O is present on a light emission surface of a light emitting element 521 explained below of the light source unit 52 and the image forming point F is present on the surface of the photoconductive drum 314. That is, the lens mirror array 20 of the solid-state head 504 guides lights emitted from a plurality of light emitting elements 521 disposed side by side in the main scanning direction and forms an image on the surface of the photoconductive drum 314. Since the lens mirror array 20 includes the plurality of optical elements 21 side by side in the main scanning direction, the lens mirror array 20 forms an elongated image in the main scanning direction. In contrast, for example, in the original reading device 10 illustrated in FIG. 1, the object point O is present on an original surface and the image forming point F is present on a light receiving surface of the image sensor. That is, the lens mirror array 20 of the original reading device 10 guides light reflected on the original surface and forms an image on the light receiving surface of the image sensor.

The optical element 21 includes, on the surface thereof, an incident-side lens surface 22, an upstream-side reflection surface 23, a downstream-side reflection surface 24, and an emission-side lens surface 25. The incident-side lens surface 22, the downstream-side reflection surface 24, and the emission-side lens surface 25 are curved surfaces convex to the outer side. The upstream-side reflection surface 23 is a flat surface. The upstream-side reflection surface 23 is an example of the first reflection surface described in the claims of the present application. The downstream-side reflection surface 24 is an example of the second reflection surface described in the claims of the present application.

An imaginary boundary surface (the cross section illustrated in FIG. 2) between two optical elements 21 adjacent to each other in the main scanning direction is a surface orthogonal to the main scanning direction and is a surface generally orthogonal to the surfaces 22, 23, 24, and 25 explained above. The cross section is an example of the cross section described in the claims of the present application but may be a cross section of the optical element 21 taken along an imaginary surface orthogonal to the main scanning direction in any position in the main scanning direction. In the lens mirror array 20 in which the plurality of optical elements 21 are integrally connected in the main scanning direction, the surfaces 22, 23, 24, and 25 of the optical elements 21 are respectively continuous surfaces connected in the main scanning direction.

Light made incident on the incident-side lens surface 22 of the optical element 21 is diverging light. The incident-side lens surface 22 converges the diverging light and directs the diverging light toward the upstream-side reflection surface 23. Light reflected on the upstream-side reflection surface 23 and the downstream-side reflection surface 24 converges once and changes to diffused light thereafter and is emitted via the emission-side lens surface 25. The emission-side lens surface 25 converges and emits the light reflected on the downstream-side reflection surface 24. An optical path of light passing the center in the main scanning direction of the optical element 21 and passing the cross section orthogonal to the main scanning direction is indicated by a broken line. An optical path of light transmitted through the optical element 21 is reflected twice and bent. The width in the cross section of the optical path of the light transmitted through the optical element 21 is smaller in the center than both ends that are along the optical path. Therefore, the lens mirror array 20 includes a constricted portion 201 narrow in the center that is along the optical path.

The lens mirror array 20 of the solid-state head 504 needs to cause light emitted from the light emitting element 521 to form an image on the surface of the photoconductive drum 314 without deviation such that deviation and distortion do not occur in an electrostatic latent image formed on the surface of the photoconductive drum 314. That is, in order to form a high-quality image in the image forming apparatus 100 in this embodiment, the lens mirror array 20 having extremely high dimension accuracy without deviation and distortion is necessary. Since the lens mirror array 20 easily bends, the holder 54 that holds the lens mirror array 20 desirably has high rigidity not to cause a bend in the lens mirror array 20. The optical element 21 of the lens mirror 20 has a small focal length and a small depth of field. Therefore, the solid-state head 504 needs to be disposed close to the photoconductive drum 314.

Figure 5:
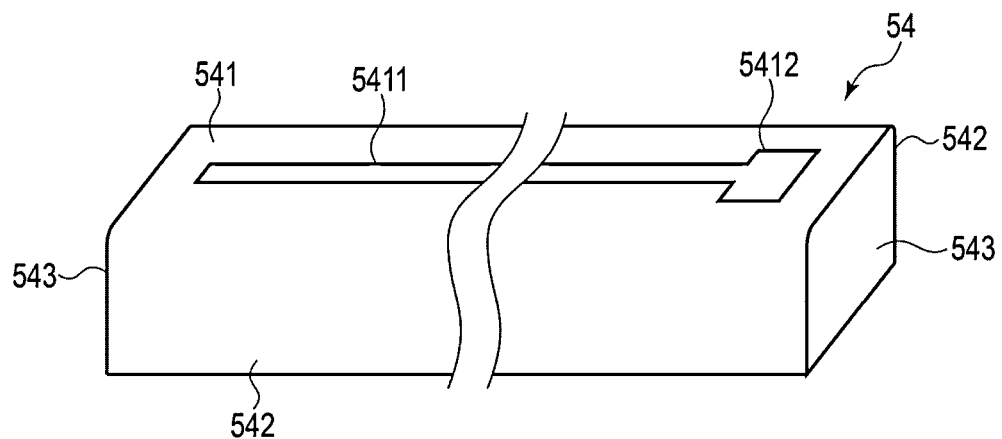
FIG. 5 is a perspective view illustrating a first example of a holder.

As illustrated in FIG. 5, the holder 54 integrally includes a top wall 541 and two sidewalls 542, 542. The top wall 541 and the two sidewalls 542, 542 of the holder 54 can be formed by, for example, bending one piece of rectangular sheet metal in two parts along the main scanning direction. Therefore, a cross section of the holder 54 taken along any plane orthogonal to the main scanning direction has a U shape. A ridge portion between the top wall 541 and the sidewall 542 has a gently curving shape. The top wall 541 is a long and flat plate shape extending in the main scanning direction and is opposed to the surface of the photoconductive drum 314. Since the solid-state head 504 is disposed close to the surface of the photoconductive drum 314, it is desirable to reduce the width in the sub-scanning direction of the top wall 541 of the holder 54 as much as possible. The holder 54 can be formed by machining sheet metal such as stainless steel or iron or can be formed by resin or the like.

The top wall 541 includes, in the center in the sub-scanning direction, a slit 5411 with a fixed width extending in the main scanning direction. The slit 5411 pierces through the top wall 541. Both ends in the longitudinal direction of the slit 5411 respectively terminate in positions separated from both end portions in the longitudinal direction of the top wall 541. Besides, the holder 54 includes two end walls 543 disposed at both ends in the main scanning direction. The outer circumferential portions of the end walls 543, the end portion of the top wall 541, and the end portion of the sidewall 542 are joined by welding or the like. The holder 54 has higher bending strength and is less easily deformed than the lens mirror array 20. In other words, the lens mirror array 20 has lower bending strength and more easily bends than the holder 54.

The width in the sub-scanning direction of the slit 5411 is slightly larger than the width in the sub-scanning direction of the constricted portion 201 in the cross section of the lens mirror array 20 illustrated in FIG. 2. The constricted portion 201 is, in the cross section orthogonal to the main scanning direction of the lens mirror array 20, a portion narrower in the center than both ends that are along an optical path on which light emitted from the light emitting element 521 passes the lens mirror array 20. The constricted portion 201 of the lens mirror array 20 indicates all portions of the lens mirror array 20 that can be disposed in the slit 5411.

Portions at both the ends along the optical path in the cross section of the lens mirror array 20 are all portions that are wider than the slit 5411 and cannot be disposed in the slit 5411. The portions indicate an emission-side portion 202 further on the emission-side lens surface 25 side than the constricted portion 201 and an incident-side portion 203 further on the incident-side lens surface 22 side than the constricted portion 201. The emission-side portion 202 projecting to the outer side of the holder 54 via the slit 5411 is an example of the projecting portion described in the claims of the present application.

The emission-side portion 202 of the lens mirror array 20 is located on the outer side of the holder 54 via the slit 5411. The incident-side portion 203 of the lens mirror array 20 is located on the inner side of the holder 54 (the light source unit 52 side). The constricted portion 201 of the lens mirror array 20 is located in the slit 5411 and located on the inner side of the holder 54. That is, the end portion on the emission-side portion 202 side of the constricted portion 201 of the lens mirror array 20 is located in the slit 5411. In other words, a portion between the downstream-side reflection surface 24 and the emission-side lens surface 25 of the lens mirror array 20 is located in the slit 5411. If the constricted portion 201 is disposed in the slit 5411 and the lens mirror array 20 is attached to the holder 54 in this way, it is possible to reduce the width of the slit 5411 and maintain high rigidity of the holder 54.

A widened portion 5412 where the width of the slit 5411 is increased is present at one end of the slit 5411. The widened portion 5412 is a hole piercing through the top wall 541 of the holder 54. The width in the sub-scanning direction of the widened portion 5412 is larger than the width in the sub-scanning direction of the incident-side portion 203 of the lens mirror array 20. The widened portion 5412 only has to have a size and a shape for enabling the incident-side portion 203 of the lens mirror array 20 to be inserted through the widened portion 5412 and can be formed in any shape.

For example, if the lens mirror array 20 illustrated in FIGS. 3 and 4 is attached to the holder 54 illustrated in FIG. 5, the lens mirror array 20 is bent, the incident-side portion 203 of the lens mirror array 20 is inserted into the widened portion 5412 of the holder 54 from the one end in the longitudinal direction, and the constricted portion 201 of the lens mirror array 20 is disposed in the slit 5411 while being slid. The length in the main scanning direction of the widened portion 5412 is length with which the lens mirror array 20 does not interfere with the top wall 541 of the holder 54 if the lens mirror array 20 is bent and the constricted portion 201 is inserted through and disposed in the slit 5411.

After the constricted portion 201 of the lens mirror array 20 is disposed in the slit 5411 of the holder 54, the lens mirror array 20 is positioned with respect to the holder 54 and the lens mirror array 20 is fixed to the holder 54. The lens mirror array 20 is fixed to the holder 54 using, for example, an adhesive S. The lens mirror array 20 brings a positioning surface 2021 of the emission-side portion 202 into surface-contact with an outer surface 5413 of the holder 54 to position the positioning surface 2021 with respect to the holder 54.

The outer surface 5413 of the top wall 541 of the holder 54 and the surface of the lens mirror array 20 are fixed by the adhesive S. In a state in which the lens mirror array 20 is positioned with respect to the holder 54, the inner surface of one sidewall 542 of the holder 54 and the surface of the lens mirror array 20 are fixed by the adhesive S. Fixing parts by the adhesive S are a plurality of parts separated in the main scanning direction and are positions not interfering with the incident-side lens surface 22, the upstream-side reflection surface 23, the downstream-side reflection surface and the emission-side lens surface 25 of the lens mirror array 20.

If the positioning surface 2021 of the emission-side portion 202 of the lens mirror array 20 is brought into surface-contact with the outer surface 5413 of the holder 54 as explained above, a positioning surface 2031 of the incident-side portion 203 of the lens mirror array 20 comes into surface-contact with the inner surface of one sidewall 542 of the holder 54. In other words, the holder 54 has a shape in which the positioning surface 2031 of the lens mirror array 20 is in surface-contact with the inner surface of one sidewall 542 of the holder 54 in a state in which the positioning surface 2021 of the lens mirror array 20 is in surface-contact with the outer surface 5413 of the holder 54.

As illustrated in FIG. 2, the light source unit 52 of the solid-state head 504 includes a substrate 522 on which the plurality of light emitting elements 521 are mounted side by side in the main scanning direction. The light source unit 52 is an example of the light emitting section described in the claims of the present application. The light emitting elements 521 may be disposed in one row or a plurality of rows extending in the main scanning direction. A driving circuit 523 is mounted on the surface of the substrate 522 on which the light emitting elements 521 are mounted. A connector 524 for power feed is fixed on the opposite surface of the surface of the substrate 522 on which the light emitting elements 521 are mounted. The substrate 522 is fixed to the inner surface of the sidewall 542 of the holder 54 by the adhesive S in a state in which the substrate 522 is positioned with respect to the holder 54.

The positioning of the substrate 522 with respect to the holder 54 is implemented by incorporating the substrate 522 in the holder 54 in which the lens mirror array 20 is positioned and fixed, causing the light emitting elements 521 to emit lights, detecting, with a camera, an image formed on an image surface via the lens mirror array 20, and disposing the substrate 522 in a position where deviation does not occur in the image. After the substrate 522 is positioned with respect to the holder 54 in this way, the holder 54 and the substrate 522 are fixed using the adhesive S in a state in which a positional relation between the substrate 522 and the holder 54 is maintained.

The plurality of light emitting elements 521 emit lights based on image data (an image signal) for black obtained by color-separating image data acquired by the original reading device 10 or image data acquired via external equipment such as a not-illustrated personal computer. The plurality of light emitting elements 521 are, for example, LEDs or OLEDs that emit lights or extinguish lights based on image data.

The lights emitted from the plurality of light emitting elements 521 are made incident on the lens mirror array 20. The lens mirror array 20 reflects and condenses the lights emitted from the light emitting elements 521 and emits light. The light emitted from the lens mirror array 20 is condensed on the surface of the rotating photoconductive drum 314. At this time, an electrostatic latent image is written line by line in the main scanning direction on the surface of the photoconductive drum 314 according to the rotation of the photoconductive drum 314. If the photoconductive drum 314 rotates a fixed amount, an electrostatic latent image for black obtained by color separation corresponding to an entire image of an original is formed on the surface of the photoconductive drum 314.

Figure 6:
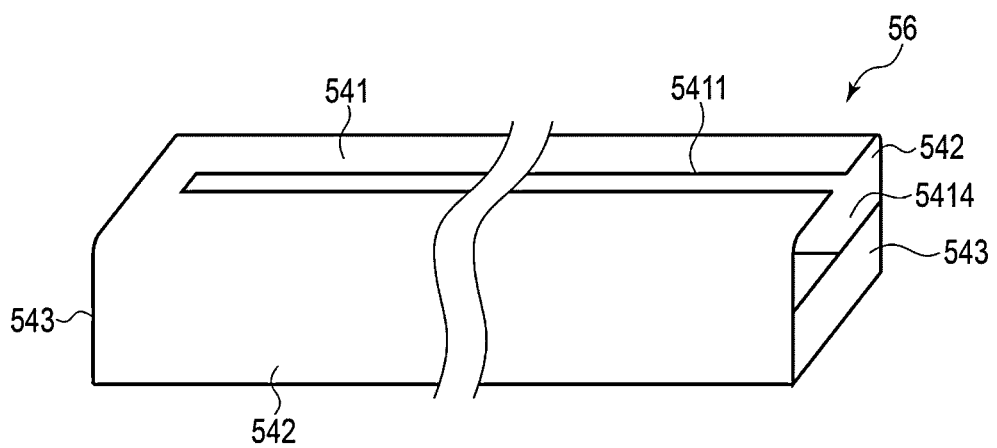
FIG. 6 is a perspective view illustrating a second example of the holder.

The holder 54 may be a holder 56 in which an opening section 5414 connected to one end of the slit 5411 is provided in one end wall 543 as illustrated in FIG. 6 instead of the widened portion 5412 provided at one end of the slit 5411. In this case, the one end of the slit 5411 provided in the top wall 541 needs to be extended to the end wall 543 in which the opening section 5414 is provided. The opening section 5414 of the end wall 543 has a size and a shape for enabling the incident-side portion 203 of the lens mirror array 20 to be inserted through the opening section 5414. In order to keep high rigidity of the holder 56, the opening section 5414 is desirably closed by not-illustrated sheet metal or the like after the lens mirror array 20 is fixed to the holder 56.

If the lens mirror array 20 is attached to the holder 56 illustrated in FIG. 6, one end in the longitudinal direction of the lens mirror array 20 is inserted through the opening section 5414 of the holder 56 and the constricted portion 201 of the lens mirror array 20 is disposed in the slit 5411 of the top wall 541. At this time, the lens mirror array 20 only has to be slid in the longitudinal direction and does not need to be bent. Positioning of the lens mirror array 20 with respect to the holder 56 and bonding and fixing of the lens mirror 20 to the holder 56 and positioning and bonding and fixing of the substrate 522 of the light source unit 52 only have to be implemented in the same manner as in the embodiment explained above.

A bending test for a solid-state head explained below was implemented in order to check a relation between the rigidity of the holder 54 (56) and the width of the slit 5411.

First, three test specimens of the solid-state head were prepared. A first test specimen A is the solid-state head 504 illustrated in FIG. 2 in which the lens mirror array 20 illustrated in FIGS. 3 and 4 is fixed to the holder 54 illustrated in FIG. 5. A second test specimen B is a solid-state head in which the lens mirror array 20 illustrated in FIGS. 3 and 4 is fixed to the holder 56 illustrated in FIG. 6. A third test specimen C is, as a comparative example, a solid-state head in which the SELFOC lens array of the related art is fixed to a slit of a holder. The holders of the third test specimen C include relatively wide slits that hold the SELFOC lens array.

The three test specimens A, B, and C were formed by pieces of sheet metal having width of the top wall of 10 mm, length of the top wall of 340 mm, and height of the sidewall of 12 mm and having the same thickness. The width of slits of the test specimens A and B was small width for allowing the constricted portion 201 of the lens mirror array 20 to pass and was set to 20% of the width of the top wall. In contrast, the width of the slit of the test specimen C was large width for allowing the SELFOC lens array to pass and was set to 40% of the width of the top wall. That is, the width of the slit of the test specimen C was set to a double of the width of the slits of the test specimens A and B.

The prepared test specimens A, B, and C were disposed in a horizontal posture in which the outer surfaces of the top walls face upward, spacers were disposed on the upper surfaces of both ends of the top walls of the test specimens A, B, and C, and reference surfaces parallel to the top walls of the test specimens A, B, and C were disposed above the top walls across these two spacers. In this state, the longitudinal direction center portions of the test specimens A, B, and C were pushed up toward the reference surfaces and amounts of the center portions of the test specimens A, B, and C approaching the reference surfaces were measured as bending amounts. Pressing forces for pushing up the centers of the test specimens A, B, and C gradually increased from 0 g. Bending amounts of the test specimens A, B, and C at a point in time when a load of 500 g was further applied from a state in which the spacers at both the ends were in contact with the reference surface (a state in which the loads of the test specimens were supported) were measured. The bending amounts were evaluated by lengths in which the distances between the centers of the test specimens and the reference surfaces changed before and after of the bending.

As a result of the measurement, the bending amount of the test specimen A was 100 μm, the bending amount of the test specimen B was 140 μm, and the bending amount of the test specimen C was 200 μm. From this result, it was found that the test specimen A has the highest rigidity and the test specimen C has the lowest rigidity. That is, it was found that the rigidity of the solid-state head can be increased by reducing the width of the slit provided in the top wall of the holder.

As explained above, with the solid-state head 504 in this embodiment, since the lens mirror array 20 is fixed to the holder 54 (56) in a state in which the constricted portion 201 of the lens mirror array 20 is disposed in the slit 5411 of the holder 56 (56), it is possible to reduce the width of the slit 5411 as much as possible and maintain high rigidity of the holder 54 and increase the rigidity of the solid-state head 504. It is possible to prevent a deficiency in which a bend occurs in the lens mirror array 20.

In the holder 54 of the solid-state head 504 in this embodiment, since the ridge portion between the top wall 541 and the sidewall 542 is bent, the width in the sub-scanning direction of the flat outer surface 5413 of the top wall 541 in surface-contact with the positioning surface 2021 of the lens mirror array 20 is smaller than the width between the outer surfaces of the two sidewalls 542 (that is, the width of the holder 54). By providing the slit 5411 in the top wall 541, the flat outer surface 5413 of the top wall 541 that can come into surface-contact with the positioning surface 2021 is further narrowed. Therefore, as in this embodiment, it is effective to reduce the width of the slit 5411 as much as possible. It is possible to, without increasing the width of the holder 54, sufficiently secure the width of the flat outer surface 5413 of the top wall 541 that comes into surface-contact with the positioning surface of the lens mirror array 20.

According to this embodiment, it is possible to, without increasing the size of the holder 54 (56) and without separately pasting a reinforcement member, increase the rigidity of the holder 54 (56) by reducing the width of the slit 5411. It is possible to form the solid-state head 504 in a compact size. Therefore, according to this embodiment, it is possible to dispose the solid-state head 504 having high rigidity near the photoconductive drum 314.

According to this embodiment, if the lens mirror array 20 is attached to the holder 54 (56), the constricted portion 201 of the lens mirror array 20 comes into slide-contact with the slit 5411 of the holder 54 (56). However, since the constricted portion 201 between the downstream-side reflection surface 24 and the emission-side lens surface 25 of the lens mirror array 20 is disposed in the slit 5411, it is possible to prevent a change in an optical characteristic due to friction.

In the solid-state head 504 in this embodiment, if the emission-side lens surface 25 disposed on the outside of the holder 54 is stained, the emission-side lens surface 25 is wiped by a brush or cloth. At this time, it is conceivable that an external force is likely to be applied to a projecting portion projecting from the slit 5411 of the holder 54 to damage the lens mirror array 20. Accordingly, as in this embodiment, it is effective to dispose, in the slit 5411, the constricted portion 201 between the downstream-side reflection surface 24 and the emission-side lens surface 25 of the lens mirror array 20 and reduce the size of a portion projecting to the outside of the holder 54 as much as possible.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An optical device, comprising:
a lens mirror array opposed to a light emitting section extending in a first direction, the lens mirror array including a plurality of optical elements side by side in the first direction, the plurality of optical elements respectively including incident-side lens surfaces on which light emitted from the light emitting section is made incident, emission-side lens surfaces that emit the incident light, and reflection surfaces that reflect the light made incident from the incident-side lens surfaces toward the emission-side lens surfaces, a cross section orthogonal to the first direction of the lens mirror array having a constricted shape, a center of which is narrower than both ends thereof that are along an optical path on which the light emitted from the light emitting section passes; and
a holder including a slit having a width smaller than a width of both ends in the cross section of the lens mirror array and larger than a width of a center in the cross section and extending in the first direction, the holder holding the lens mirror array in a state in which a constricted portion in the center in the cross section of the lens mirror array is disposed in the slit.

2. The optical device according to claim 1, wherein the light emitting section comprises a plurality of light emitting elements and a substrate on which the plurality of light emitting elements are mounted side by side in the first direction.

3. The optical device according to claim 2, wherein the holder holds the substrate in a state in which the plurality of light emitting elements are positioned with respect to the lens mirror array.

4. The optical device according to claim 3, wherein width of the optical path passing the cross section of the lens mirror array is smaller in the center than at both the ends.

5. The optical device according to claim 3, wherein the slit of the holder includes a widened portion having a size for enabling a portion further on the incident-side lens surface side than the constricted portion of the lens mirror array to be inserted through the widened section.

6. The optical device according to claim 3, wherein the holder includes, at an end portion in the first direction, an opening section having a size for enabling a portion further on the incident-side lens surface side than the constricted portion of the lens mirror array to be inserted through the opening section.

7. The optical device according to claim 3, wherein the holder holds the lens mirror array in a state in which a portion between the reflection surfaces and the emission-side lens surfaces of the plurality of optical elements of the lens mirror array is disposed in the slit.

8. The optical device according to claim 7, wherein
the lens mirror array includes a projecting portion projecting to an opposite side of the light emitting section via the slit, the projecting portion including a positioning surface opposed to an outer surface of the holder, and
the holder brings the positioning surface of the lens mirror array into surface-contact with the outer surface to position the lens mirror array.

9. The optical device according to claim 3, wherein the lens mirror array has a bending strength lower than a bending strength of the holder.

10. The optical device according to claim 3, wherein
the reflection surfaces include a first reflection surface that reflects the light made incident from the incident-side lens surfaces and a second reflection surface that reflects the light reflected by the first reflection surface toward the emission-side lens surfaces, and
the lens mirror array forms an erected image at an image forming point of the lens mirror array.

11. An image forming apparatus, comprising:
a photoconductive drum;
a supply of toner; and
an optical device, comprising:
a lens mirror array opposed to a light emitting section extending in a first direction, the lens mirror array including a plurality of optical elements side by side in the first direction, the plurality of optical elements respectively including incident-side lens surfaces on which light emitted from the light emitting section is made incident, emission-side lens surfaces that emit the incident light, and reflection surfaces that reflect the light made incident from the incident-side lens surfaces toward the emission-side lens surfaces, a cross section orthogonal to the first direction of the lens mirror array having a constricted shape, a center of which is narrower than both ends thereof that are along an optical path on which the light emitted from the light emitting section passes; and
a holder including a slit having a width smaller than a width of both ends in the cross section of the lens mirror array and larger than a width of a center in the cross section and extending in the first direction, the holder holding the lens mirror array in a state in which a constricted portion in the center in the cross section of the lens mirror array is disposed in the slit.

12. The image forming apparatus according to claim 11, wherein the light emitting section comprises a plurality of light emitting elements and a substrate on which the plurality of light emitting elements are mounted side by side in the first direction.

13. The image forming apparatus according to claim 12, wherein the holder holds the substrate in a state in which the plurality of light emitting elements are positioned with respect to the lens mirror array.

14. The image forming apparatus according to claim 13, wherein width of the optical path passing the cross section of the lens mirror array is smaller in the center than at both the ends.

15. The image forming apparatus according to claim 13, wherein the slit of the holder includes a widened portion having a size for enabling a portion further on the incident-side lens surface side than the constricted portion of the lens mirror array to be inserted through the widened section.

16. The image forming apparatus according to claim 13, wherein the holder includes, at an end portion in the first direction, an opening section having a size for enabling a portion further on the incident-side lens surface side than the constricted portion of the lens mirror array to be inserted through the opening section.

17. The image forming apparatus according to claim 13, wherein the holder holds the lens mirror array in a state in which a portion between the reflection surfaces and the emission-side lens surfaces of the plurality of optical elements of the lens mirror array is disposed in the slit.

18. The image forming apparatus according to claim 17, wherein
the lens mirror array includes a projecting portion projecting to an opposite side of the light emitting section via the slit, the projecting portion including a positioning surface opposed to an outer surface of the holder, and
the holder brings the positioning surface of the lens mirror array into surface-contact with the outer surface to position the lens mirror array.

19. The image forming apparatus according to claim 13, wherein the lens mirror array has a bending strength lower than a bending strength of the holder.

20. The image forming apparatus according to claim 13, wherein
the reflection surfaces include a first reflection surface that reflects the light made incident from the incident-side lens surfaces and a second reflection surface that reflects the light reflected by the first reflection surface toward the emission-side lens surfaces, and
the lens mirror array forms an erected image at an image forming point of the lens mirror array.

* * * * *